US008200409B2

(12) United States Patent
Sawamoto

(10) Patent No.: US 8,200,409 B2
(45) Date of Patent: Jun. 12, 2012

(54) TRAVEL CONTROL SYSTEM FOR VEHICLE

(75) Inventor: Kiichiro Sawamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 721 days.

(21) Appl. No.: 11/905,030

(22) Filed: Sep. 27, 2007

(65) Prior Publication Data

US 2008/0109120 A1   May 8, 2008

(30) Foreign Application Priority Data

Oct. 6, 2006  (JP) ................................. 2006-274718

(51) Int. Cl.
*B60T 7/12*   (2006.01)
*G05D 1/00*   (2006.01)
*G06F 7/00*   (2006.01)
*G06F 17/00*  (2006.01)

(52) U.S. Cl. .............. 701/96; 701/70; 701/93; 701/300; 180/170

(58) Field of Classification Search .................... 701/93, 701/96, 300
See application file for complete search history.

(56) References Cited

U.S. PATENT DOCUMENTS

| 6,708,099 | B2* | 3/2004 | Tellis et al. ...................... 701/96 |
| 7,373,237 | B2* | 5/2008 | Wagner et al. ................... 701/96 |
| 7,386,385 | B2* | 6/2008 | Heinrichs-Bartscher ....... 701/93 |
| 7,477,979 | B2* | 1/2009 | Arai et al. ........................ 701/96 |
| 7,493,218 | B2* | 2/2009 | Sawamoto .................... 701/301 |
| 7,512,475 | B2* | 3/2009 | Perisho et al. .................. 701/96 |
| 2005/0216168 | A1* | 9/2005 | Arai et al. ........................ 701/96 |
| 2005/0216171 | A1* | 9/2005 | Heinrichs-Bartscher ....... 701/96 |

FOREIGN PATENT DOCUMENTS

| JP | 06-171482 A | 6/1994 |
| JP | 2002-319100 | 10/2002 |

\* cited by examiner

*Primary Examiner* — Jack W Keith
*Assistant Examiner* — Rami Khatib
(74) *Attorney, Agent, or Firm* — Arent Fox LLP

(57) ABSTRACT

A travel controller which controls the travel of a subject vehicle based on a distance to and a relative speed with respect to a control object determined by a control object determiner. If stoppage of the subject vehicle by a decelerating operation of a driver is detected by a manual stoppage detector and a comparator determines that a distance to the object in or on a travel locus is equal to or larger than a determination threshold value, the comparator excludes the object from being considered as a control object.

12 Claims, 5 Drawing Sheets

INTER-VEHICLE DISTANCE IS DECREASED WHEN DRIVER HAS INTENTION TO FOLLOW PRECEDING VEHICLE

INTER-VEHICLE DISTANCE IS INCREASED WHEN DRIVER HAS NO INTENTION TO FOLLOW PRECEDING VEHICLE

OBJECT ALONG ROAD IS NOT ERRONEOUSLY RECOGNIZED AS PRECEDING VEHICLE
INTER-VEHICLE DISTANCE > B
ESTIMATED TRAVEL LOCUS

ESTIMATED TRAVEL LOCUS
PRECEDING VEHICLE IS RECOGNIZED

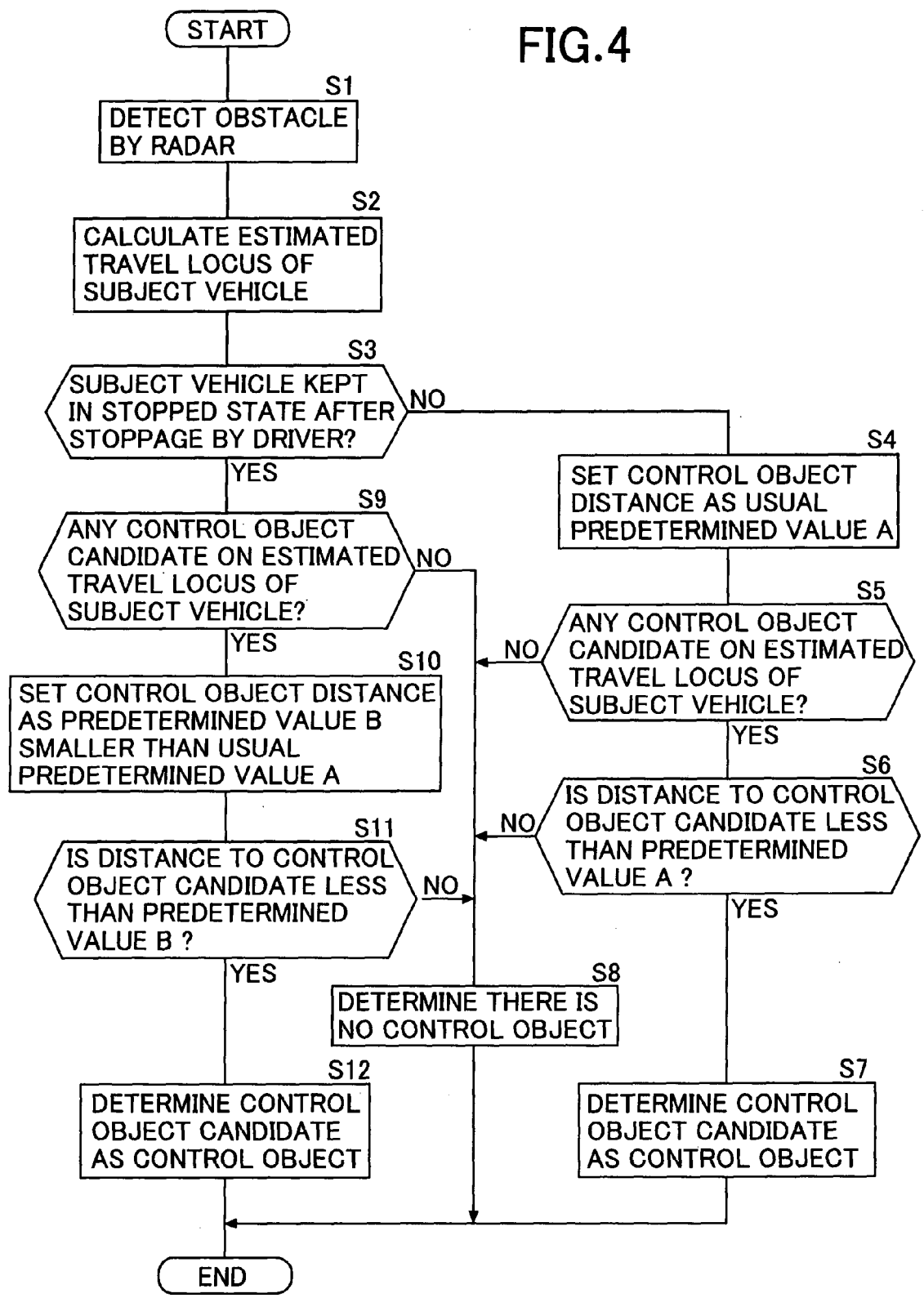

TRAVEL CONTROL SYSTEM FOR VEHICLE

BACKGROUND OF THE INVENTION

1. Field of the Invention

The present invention relates to a travel control system for a vehicle which causes the vehicle to follow a preceding vehicle at a predetermined inter-vehicle distance in a low vehicle speed region.

2. Description of the Related Art

Japanese Patent Application Laid-open No. 2002-319100 (JP '100) discloses a travel locus estimating system which estimates a future travel locus of a subject vehicle based on a yaw rate and a speed of the vehicle. In the disclosed system, to compensate for a decrease in the accuracy of estimating the travel locus due to a decrease in the accuracy of detecting the yaw rate at a lower vehicle speed, such as when the vehicle is being started, an estimated travel locus before stoppage of the subject vehicle is stored. As such, when the subject vehicle is started after the stoppage, a following-travel control of the subject vehicle is performed using the stored estimated travel locus, wherein the subject vehicle is able to follow a preceding vehicle.

In general, the following-travel control system, disclosed by JP '100, has problems that are described below.

In particular, FIG. 5A illustrates a situation where a preceding vehicle is stopped at a position slightly forward of an entrance of a curved course, and a subject vehicle traveling behind the preceding vehicle is stopped at a leading end of a straight course before the curved course. As shown in FIG. 5B, a driver of the subject vehicle turns on a switch for starting the following-travel control system which causes the subject vehicle to automatically travel at a predetermined inter-vehicle distance and initially follow the preceding vehicle at a low speed. At this time, the subject vehicle is at the leading end of the straight course before the curved course, and thus, a travel locus of the subject vehicle is estimated to extend straight forward. Therefore, the preceding vehicle, which is displaced to the right of the estimated travel locus, is not recognized as a preceding vehicle, and an object along the road, such as, for example, a reflecting plate provided on a guard rail, is erroneously recognized as the preceding vehicle.

When the driver of the subject vehicle turns on the switch for starting the following-travel control system in this state to start the subject vehicle, because the object along the road is erroneously recognized as the preceding vehicle, the subject vehicle is immediately decelerated and stopped in order to maintain the predetermined inter-vehicle distance to the object along the road, wherein the subject vehicle is not able to properly follow the actual preceding vehicle.

Thereafter, the subject vehicle enters the curved course and begins turning to the right. As a result, as shown in FIG. 5C, the travel locus of the subject vehicle is estimated to be to the right in the forward direction, that is, the preceding vehicle is correctly recognized as the actual preceding vehicle wherein the following-travel control system begins to properly target the actual preceding vehicle.

Accordingly, in the system disclosed by JP '100, the movement of the subject vehicle becomes jerky when starting the following-travel control at the time the preceding vehicle begins to travel, resulting in a very high probability that a proper and smooth starting of the subject vehicle is hindered.

SUMMARY OF THE INVENTION

The present invention has been attained in view of the above circumstances. An aspect of the present invention is to prevent unintended vehicle control with respect to an object for which a driver has no intention to perform a vehicle control.

In order to achieve the above aspect, according to a first feature of the present invention, there is provided a travel control system for a vehicle including a vehicle speed detector which detects a vehicle speed of a subject vehicle. A transmitter-receiver transmits an electromagnetic wave toward a detection area in a travel direction of the subject vehicle and then receives the wave reflected from an object existing within the detection area. A travel locus estimator estimates a travel locus of the subject vehicle. An object detector detects a distance to, as well as a relative speed with respect to, an object based on a signal from the transmitter-receiver. A control object determiner determines an object with respect to which the subject vehicle is controlled based on the distance and relative speed detected by the object detector and the travel locus estimated by the travel locus estimator. A travel controller controls the travel direction of the subject vehicle based on a distance to, and a relative speed with respect to, the control object determined by the control object determiner. A decelerating operation detector detects a decelerating operation by the driver. A manual stoppage detector detects that the subject vehicle has been stopped by the decelerating operation of the driver based on outputs from the vehicle speed detector and the decelerating operation detector. A comparator compares a distance to the object existing on the travel locus of the subject vehicle estimated by the travel locus estimator with a determination threshold value, wherein when the stoppage of the subject vehicle by the decelerating operation of the driver has been detected by the manual stoppage detector and when it has been determined by the comparator that the distance to the object existing on the travel locus is equal to or larger than the determination threshold value, the control object determiner excludes such an object from among the control objects.

Based on the structural configuration of the first feature, when the travel controller performs the travel control of the subject vehicle based on the distance to, and the relative speed with respect to, the control object determined by the control object determiner, if the manual stoppage detector detects the stoppage of the subject vehicle and the comparator determines that the distance to the object existing on the travel locus of the subject vehicle is equal to or larger than the determination threshold value, the control object determiner excludes the object from the control objects. Therefore, when the subject vehicle is stopped at a position far away from an object, that is, when the driver has no intention to control the subject vehicle with respect to the object as being a control object, it is possible to prevent any unintended vehicle control with respect to the object, thereby eliminating an uncomfortable feeling to the driver.

According to a second feature of the present invention, in addition to the first feature, when operation of a direction indicator by the driver or an amount of steering by the driver equal to or larger than a predetermined value has been detected, the determination threshold value is increased.

Based on the structural configuration of the second feature, when operation of the direction indicator by the driver has been detected or when the amount of steering by the driver equal to or larger than the predetermined value has been detected, it is determined that the driver has no intention to cause the subject vehicle to follow the preceding vehicle. Therefore, in such a case, when the driver of the subject vehicle has no intention of following the preceding vehicle, the determination threshold value is increased to prevent the subject vehicle from starting to follow the preceding vehicle.

According to a third feature of the present invention, in addition to the first or second feature, the determination threshold value is a distance that enables the subject vehicle to start while avoiding the object.

Based on the structural configuration of the third feature, the determination threshold value is set to be a distance that enables the subject vehicle to start while avoiding the stationary object. Therefore, when the driver has no intention to perform the travel control of the subject vehicle based on the distance to, and the relative speed with respect to, the object, the subject vehicle is started while avoiding the object.

According to a fourth feature of the present invention, in addition to the third feature, the determination threshold value is approximately 10 meters (m).

Based on the structural configuration of the fourth feature, the determination threshold value for determining whether the object is a control object is set to be approximately 10 m. Therefore, the subject vehicle is started while easily avoiding the object.

According to a fifth feature of the present invention, in addition to any of the first-to-fourth features, the system also includes a travel control starting intention detector, which detects the driver's intention to start travel control, and a travel control starter for starting the travel control of the subject vehicle by the travel controller when the driver's intention to start the travel control has been detected. The control object determiner also determines whether the object is excluded from among the control objects based on a distance to the object when the driver's intention to start the travel control has been detected by the travel control starting intention detector.

Based on the structural configuration of the fifth feature, when the travel control starting intention detector detects the driver's intention to start the travel control and the travel control starter starts the travel control of the subject vehicle by the travel controller, the control object determiner determines whether the object is a control object based on the distance to the object when the driver's intention to start the travel control has been detected. Therefore, it is possible to smoothly perform the starting of the subject vehicle to follow the object determined as the control object, or to start the subject vehicle while avoiding the object when it is determined that the object is not the control object.

The above and other aspects, features and advantages of the invention will become apparent from a preferred embodiment taken in conjunction with the accompanying drawings.

BRIEF DESCRIPTION OF THE DRAWINGS

FIG. 4 is a flowchart explaining operation of the following-travel control system.

DETAILED DESCRIPTION OF PREFERRED EMBODIMENT

Figure 1:
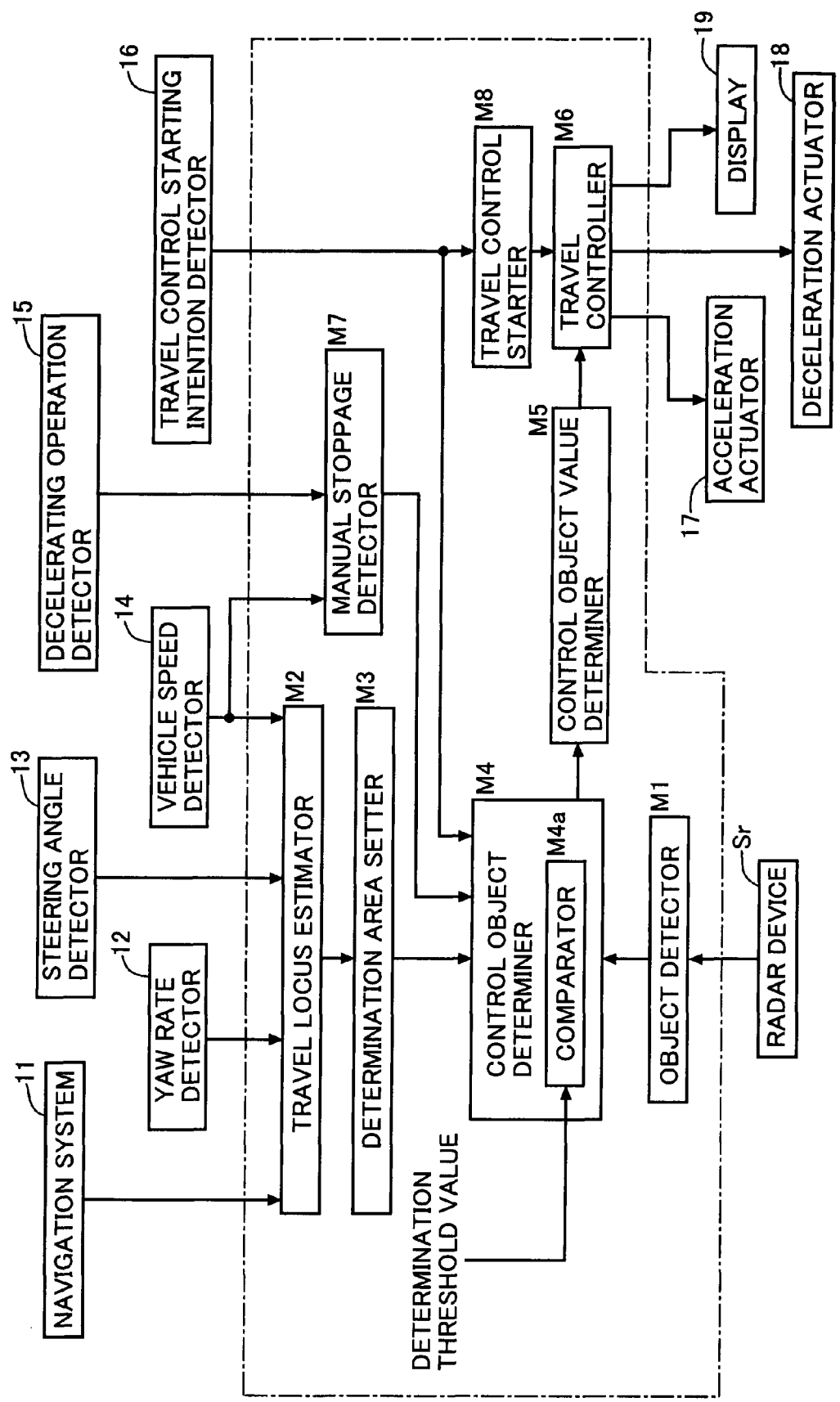
FIG. 1 is a block diagram of a following-travel control system according to an embodiment of the present invention.

Referring to FIG. 1, a block diagram of a following-travel control system is illustrated. The following-travel control system causes a subject vehicle to travel at a predetermined inter-vehicle distance from a preceding vehicle traveling ahead of the subject vehicle while primarily in a lower vehicle speed region. When the preceding vehicle decelerates and stops, the following-travel control system correspondingly causes the subject vehicle to decelerate and stop. The following-travel control system includes an object detector M1, a travel locus estimator M2, a determination-area setter M3, a control object determiner M4, a comparator M4a, a control target value determiner M5, a travel controller M6, a manual stoppage detector M7, and a travel control starter M8.

A radar device Sr, such as a laser radar device or a millimeter wave radar device, is connected to the object detector M1. A navigation system 11, a yaw rate detector 12, a steering-angle detector 13, and a vehicle speed detector 14 are connected to the travel locus estimator M2. A travel control starting intension detector 16 is connected to the control object determiner M4. The vehicle speed detector 14 and a decelerating-operation detector 15 are connected to the manual stoppage detector M7. The travel control starting intention detector 16 is connected to the travel control starter M8. An acceleration actuator 17, a deceleration actuator 18, and a display 19 are connected to the travel controller M6.

The decelerating-operation detector 15 includes, for example, a brake switch, which is turned on upon depression of a brake pedal by a driver, and a depression force detector for detecting a depression force applied to the brake pedal by the driver. When the driver voluntarily performs a braking operation to stop the subject vehicle during the following-travel control while maintaining a predetermined inter-vehicle distance to the preceding vehicle, control of the following-travel control system is automatically terminated. The travel control starting intention detector 16 then detects the turning-on operation of a travel control starting switch when the driver restarts the following-travel control.

The object detector M1 calculates a distance to, and a relative speed with respect to, an object existing ahead of the subject vehicle based on an output from the radar device Sr. The travel locus estimator M2 estimates a future travel locus of the subject vehicle based on road information stored in the navigation system 11, a yaw rate of the subject vehicle detected by the yaw rate detector 12, a steering angle detected by the steering-angle detector 13, and a vehicle speed detected by the vehicle speed detector 14.

The determination-area setter M3 sets a determination area having a predetermined width and a predetermined length along a centerline of the future travel locus of the subject vehicle estimated by the travel-locus estimator M2.

The control object determiner M4 determines that a certain object existing in the determination area, from among a plurality of objects detected by the object detector M1, is a preceding vehicle which is a control object for the following-travel control.

The control target value determiner M5 determines a target vehicle speed, a target acceleration, a target inter-vehicle distance, and the like, which are parameters for allowing the subject vehicle to travel following the preceding vehicle (control object) while maintaining a predetermined inter-vehicle distance to the preceding vehicle.

The travel controller M6 drives the acceleration actuator 17 and the deceleration actuator 18 based on the control target value determined by the control target value determiner M5 to open and close a throttle valve, or operate a brake device, thereby performing the following-travel control targeting of the preceding vehicle and informing the driver of a current controlled state of the vehicle through an indication on the display 19.

During the following-travel control targeting of the preceding vehicle, when the decelerating-operating detector 15 detects the decelerating operation by the driver of the subject vehicle (for example, depression on the brake pedal) and the vehicle speed detector 14 detects a state of a zero vehicle-speed, the manual-stoppage detector M7 determines that the subject vehicle has been stopped by a braking operation rather than by the following-travel control.

When the subject vehicle has been stopped by the braking operation, the following-travel control targeting of the preceding vehicle is temporarily stopped. When the driver of the subject vehicle turns the travel-control starting switch on, the travel-control starting intention detector 16 detects such an operation, and the following-travel control targeting of the preceding vehicle is restarted. When the travel-control starting intention detector 16 detects that the following-travel control has started (or restarted), the comparator M4a compares a distance to an object, which is a potential candidate to be a preceding vehicle and which has been detected by the object detector M1, with a predetermined value B which will be described later. When the distance to the object is equal to or larger than the predetermined value B, the object is excluded from being considered as a preceding vehicle. The predetermined value B is set to be a distance (for example, 10 m) which is a sufficient distance to enable the subject vehicle to easily bypass such an object from being identified as a preceding vehicle.

Thus, it is possible to eliminate the problem wherein the subject vehicle remains in a stopped state without starting when behind a stopped preceding vehicle, thereby enabling the smooth starting of the subject vehicle according to the driver's intention.

Figure 2A:
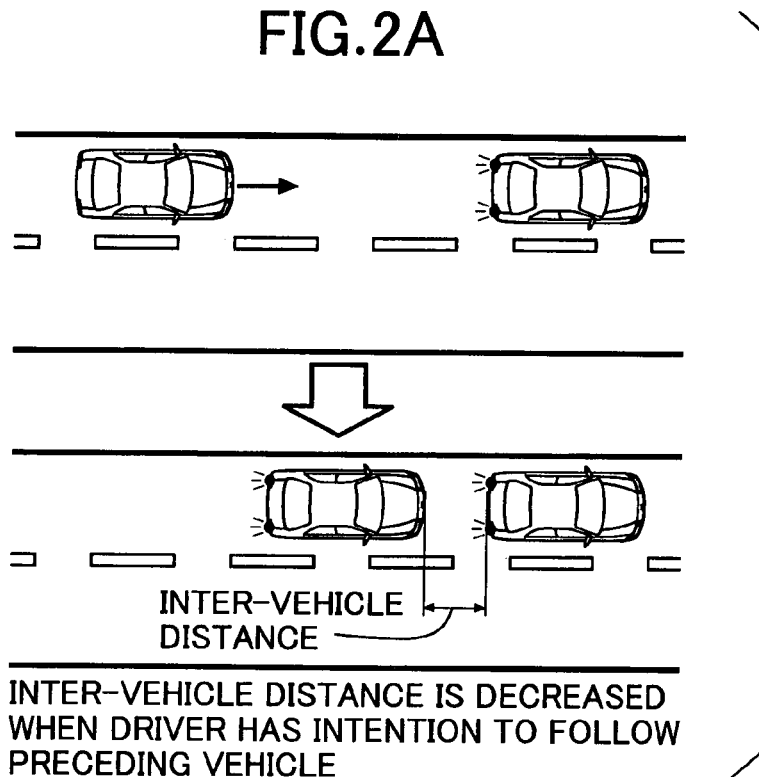
FIGS. 2A-2B are diagrams explaining operation of the following-travel control system when a subject vehicle is stopped after a preceding vehicle is stopped.
Figure 2B:
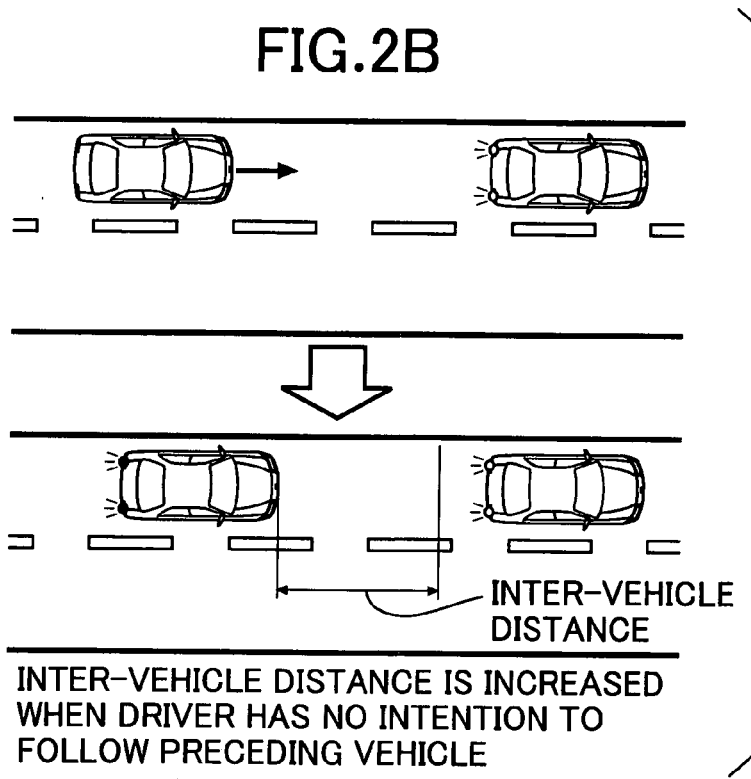

The present invention will be further described with reference to FIGS. 2A-2B. When the subject vehicle is stopped by a voluntary braking operation performed by the driver, if the driver has an intention to continue traveling while following a preceding vehicle, the subject vehicle tends to be stopped at a position near the stopped preceding vehicle (see FIG. 2A). On the other hand, when the driver has no intention for the subject vehicle to follow the preceding vehicle, in such a case, where the preceding vehicle is stopped while flashing hazard lamps, the subject vehicle tends to be stopped at a position that is relatively far away from the preceding vehicle (see FIG. 2B). This is because if the subject vehicle is stopped close to the preceding vehicle, the preceding vehicle becomes an obstacle which the subject vehicle should bypass or avoid following.

Therefore, when the subject vehicle is stopped at a position having a distance smaller than the predetermined value B to the preceding vehicle, the following-travel control is performed at the next starting of the subject vehicle with the preceding vehicle determined as a control object that is desired to be followed. When the subject vehicle is stopped at a position having a distance equal to or larger than the predetermined value B to the preceding vehicle, the preceding vehicle is determined to not be a control object which the driver can easily bypass or avoid following in the next starting of the subject vehicle. Thus, it is possible to enable the travel control according to the driver's intention and eliminate an uncomfortable feeling to the driver.

Figure 5A:
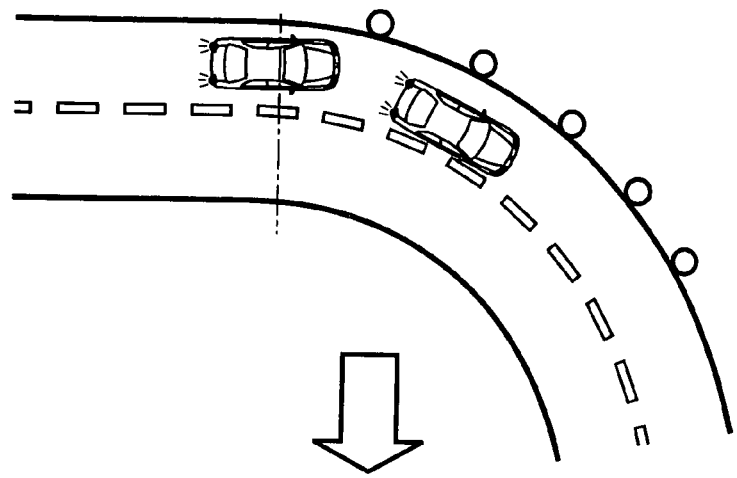
FIGS. 5A-5C are diagrams explaining operation of a conventional following-travel control system.
Figure 5B:
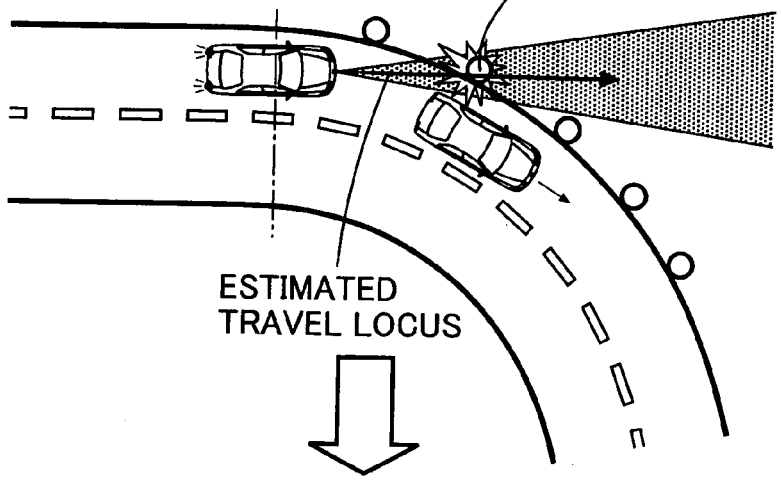
Figure 5C:
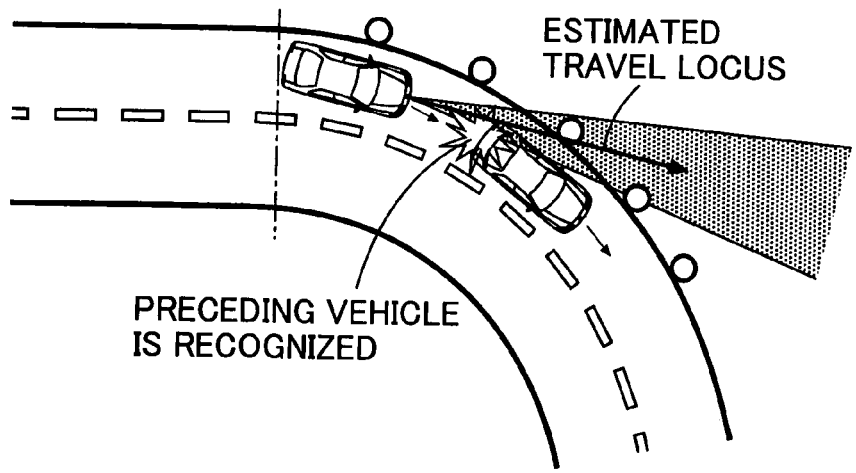

The following-travel control system disclosed herein also avoids the problems of the following-travel control system disclosed by JP '100 which was described above with reference to FIGS. 5A-5C.

Figure 3A:
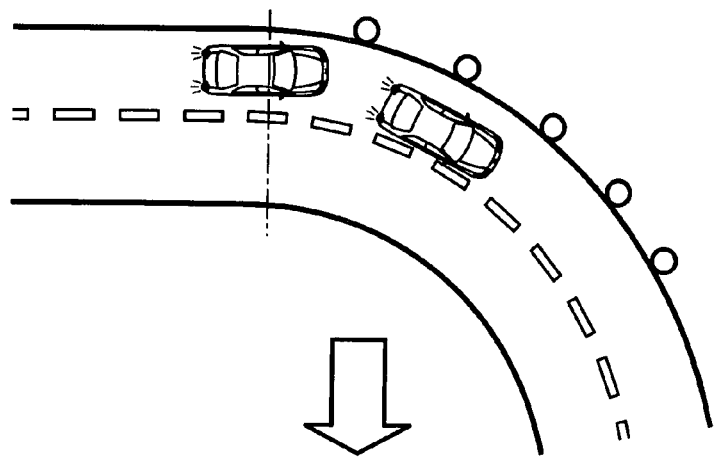
FIGS. 3A-3C are diagrams explaining operation of the following-travel control system when the subject vehicle is started after the preceding vehicle has started to move from a stopped state.
Figure 3B:
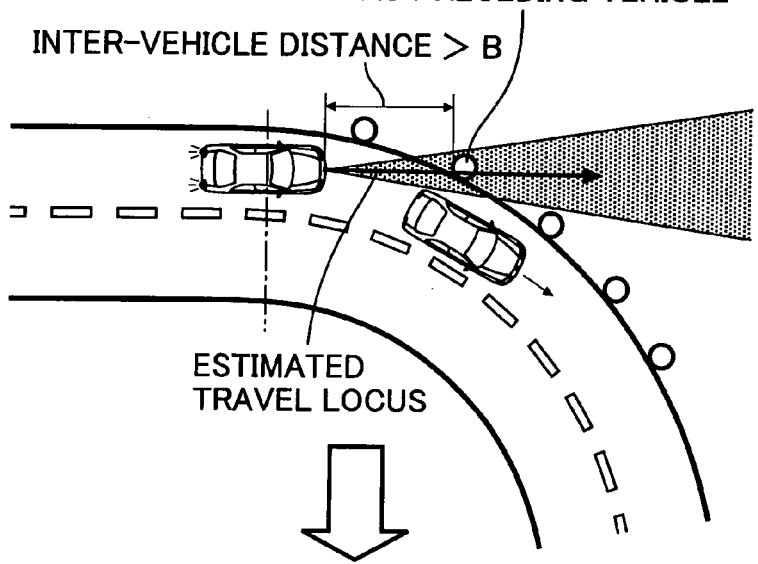
Figure 3C:
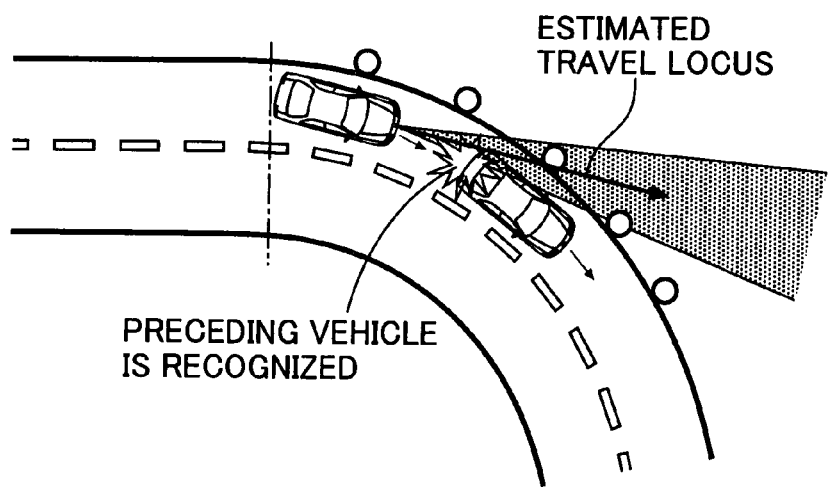

Specifically, as shown in the following-travel control system disclosed herein, in FIG. 3A, a preceding vehicle is stopped at a position slightly forward of an entrance of a curved course and a subject vehicle traveling behind the preceding vehicle is stopped at a leading end of a straight course before the curved course. As shown in FIG. 3B, a driver of the subject vehicle turns on a switch for starting a following-travel control to cause the subject vehicle, at a predetermined inter-vehicle distance, to follow the preceding vehicle which will start at a low speed. At this time, a distance D to an object existing along a road on an estimated travel locus of the subject vehicle is larger than the distance B, and thus, the object along the road is not erroneously recognized as a preceding vehicle. When the subject vehicle enters the curved course and starts to turn to the right, as shown in FIG. 3C, the travel locus of the subject vehicle is estimated to extend forward and to the right, the preceding vehicle is correctly recognized as a preceding vehicle, and the following-travel control targeting of the preceding vehicle is started.

In this way, according to the present embodiment, when the switch for starting the following-travel control is turned on, it is possible to avoid a situation where the preceding vehicle on the road is erroneously recognized as a preceding vehicle for which following-travel control is desired which would cause the subject vehicle to decelerate and immediately stop after starting. Thus, the following-travel control targeting of the preceding vehicle is smoothly started.

The operation of the following-travel control system according to the present embodiment will be further described with reference to the flowchart in FIG. 4.

First, at Step S1, an object ahead of the subject vehicle is detected by the radar device Sr. At Step S2, an estimated travel locus of the subject vehicle is calculated. In Step S3, if it is determined that the subject vehicle is not brought into a stoppage-retained state after being stopped by the braking operation of the driver, namely, if the subject vehicle is under a usual following-travel control, a control object distance is set at a predetermined value A (for example, 100 m) in Step S4. Any object present within the control object distance is determined to be an object with respect to which the subject vehicle is controlled.

If a control object candidate exists on the estimated travel locus of the subject vehicle at Step S5, and if a distance to the control object candidate is smaller than the predetermined distance A at Step S6, the control object candidate is determined as a control object at Step S7, and the following-travel control is performed. If no control object candidate exists on the estimated travel locus of the subject vehicle at Step S5, or if the distance to the control object candidate is equal to or larger than the predetermined distance A at Step S6, it is determined at Step S8 that there is no control object.

If it is determined at Step S3 that the subject vehicle is brought into the stoppage-retained state after being stopped by the braking operation of the driver, and if a control object candidate exists on the estimated travel locus of the subject vehicle at Step S9, a control object distance is set at a predetermined value B (for example, 10 m) smaller than the usual predetermined value A at Step S10. The predetermined value B corresponds to a determination threshold value of the present invention. If the distance to the control object candidate is smaller than the predetermined value B at Step S11, the control object candidate is determined as a control object at Step S12, and the following-travel control is performed. If no control object candidate exists on the estimated travel locus of the subject vehicle at Step S9, or if the distance to the control object candidate is equal to or larger than the predetermined distance B at Step S11, it is determined at Step S8 that there is no control object.

When the driver has no intention to perform the following-travel control with respect to the control object candidate, the driver operates a direction indicator or a steering wheel trying to avoid the control object candidate. Therefore, the predetermined value B may be increased further when the operation of the direction indicator is detected or when a steering amount equal to or larger than a predetermined value has been detected. With this arrangement, it is possible to reliably exclude a preceding vehicle for which the driver has no intention to perform the following-travel control from the category of control objects.

The embodiment of the present invention has been described above, but various changes in design may be made without departing from the subject matter of the present invention.

For example, the predetermined values A and B are not limited to those shown in the embodiment and may be changed accordingly.

What is claimed is:

1. A travel control system for a vehicle, comprising:
   a vehicle speed detector configured to detect a vehicle speed of a subject vehicle;
   a transmitter-receiver configured to transmit an electromagnetic wave toward a detection area in a travel direction of the subject vehicle and receiving the wave reflected from an object existing within the detection area;
   an object detector configured to detect a distance to and a relative speed with respect to the object based on a signal from the transmitter-receiver;
   a travel locus estimator configured to estimate a travel locus of the subject vehicle;
   a control object determiner configured to determine if the object in the detection area is a control object based on the distance detected by the object detector and the travel locus estimated by the travel locus estimator;
   a travel controller configured to control a following-travel of the subject vehicle based on a distance to and a relative speed with respect to the control object determined by the control object determiner;
   a decelerating operation detector configured to detect a decelerating operation by a driver of the subject vehicle;
   a manual stoppage detector configured to detect that the subject vehicle has been stopped by the decelerating operation of the driver based on outputs from the vehicle speed detector and the decelerating operation detector; and
   a comparator configured to compare a distance to the object existing on the travel locus of the subject vehicle estimated by the travel locus estimator to first and second determination threshold values (A, B),
   wherein when the stoppage-retained state of the subject vehicle by the decelerating operation of the driver has not been detected by the manual stoppage detector, and when it has been determined by the comparator that the distance to the object existing on the travel locus is equal to or larger than the first determination threshold value (A), the control object determiner excludes the object from being considered as the control object of the following-travel, and
   wherein when the stoppage-retained state of the subject vehicle by the decelerating operation of the driver has been detected by the manual stoppage detector, and when it has been determined by the comparator that the distance to the object existing on the travel locus is equal to or larger than the second determination threshold value (B) which is smaller than the first determination threshold value (A), the control object determiner excludes the object from being considered as the control object of the following-travel.

2. A travel control system for a vehicle according to claim 1, wherein when the operation of a direction indicator by the driver of the subject vehicle is detected or when an amount of steering by the driver of the subject vehicle equal to or larger than a predetermined value is detected, the second determination threshold value (B) is increased.

3. A travel control system for a vehicle according to claim 2, wherein the second determination threshold value (B) is a distance that enables the subject vehicle to start while avoiding the object.

4. A travel control system for a vehicle according to claim 3, wherein the second determination threshold value (B) is approximately 10 m.

5. A travel control system for a vehicle according to claim 4, further comprising: a travel control starting intention detector configured to detect the driver's intention to start travel control; and
   a travel control starter configured to start the travel control of the subject vehicle by the travel controller when the driver's starting of the travel control has been detected by the travel control starting intention detector,
   wherein the control object determiner determines whether the object is excluded from among the control objects based on a distance to the object when the driver's starting of the travel control has been detected by the travel control starting intention detector.

6. A travel control system for a vehicle according to claim 2, further comprising: a travel control starting intention detector configured to detect the driver's intention to start travel control; and
   a travel control starter configured to start the travel control of the subject vehicle by the travel controller when the driver's starting of the travel control has been detected by the travel control starting intention detector,
   wherein the control object determiner determines whether the object is excluded from among the control objects based on a distance to the object when the driver's starting of the travel control has been detected by the travel control starting intention detector.

7. A travel control system for a vehicle according to claim 3, further comprising: a travel control starting intention detector configured to detect the driver's intention to start travel control; and
   a travel control starter configured to start the travel control of the subject vehicle by the travel controller when the driver's starting of the travel control has been detected by the travel control starting intention detector,
   wherein the control object determiner determines whether the object is excluded from among the control objects based on a distance to the subject when the driver's starting of the travel control has been detected by the travel control starting intention detector.

8. A travel control system for a vehicle according to claim 1, wherein the second determination threshold value (B) is a distance that enables the subject vehicle to start while avoiding the object.

9. A travel control system for a vehicle according to claim 8, wherein the second determination threshold value (B) is approximately 10 m.

10. A travel control system for a vehicle according to claim 9, further comprising: a travel control starting intention detector configured to detect the driver's intention to start travel control; and
   a travel control starter configured to start the travel control of the subject vehicle by the travel controller when the driver's starting of the travel control has been detected by the travel control starting intention detector, wherein the control object determiner determines whether the object is excluded from among the control objects based on a distance to the object when the driver's starting of the travel control has been detected by the travel control starting intention detector.

11. A travel control system for a vehicle according to claim 8, further comprising: a travel control starting intention detector configured to detect the driver's intention to start travel control; and a travel control starter configured to start the travel control of the subject vehicle by the travel controller when the driver's starting of the travel control has been detected by the travel control starting intention detector, wherein the control object determiner determines whether the object is excluded from among the control objects based on a distance to the object when the driver's starting of the travel control has been detected by the travel control starting intention detector.

12. A travel control system for a vehicle according to claim 1, further comprising: a travel control starting intention detector configured to detect the driver's intention to start travel control; and a travel control starter configured to start the travel control of the subject vehicle by the travel controller when the driver's starting of the travel control has been detected by the travel control starting intention detector, wherein the control object determiner determines whether the object is excluded from among the control objects based on a distance to the object when the driver's starting of the travel control has been detected by the travel control starting intention detector.

* * * * *